Nov. 18, 1930.   C. G. OLSON   1,782,387
LOCK WASHER
Filed Dec. 5, 1928
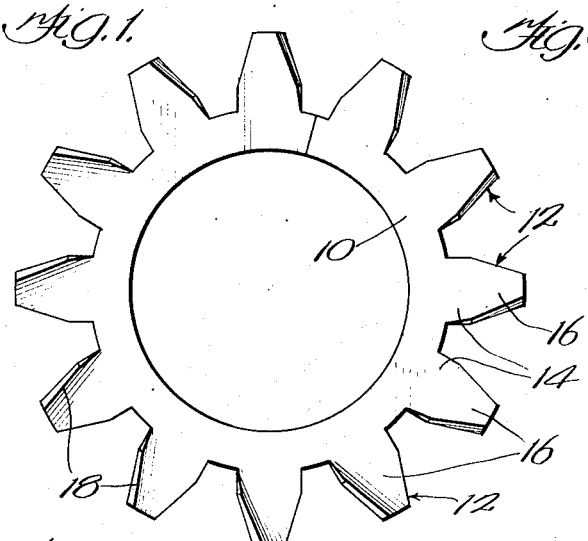
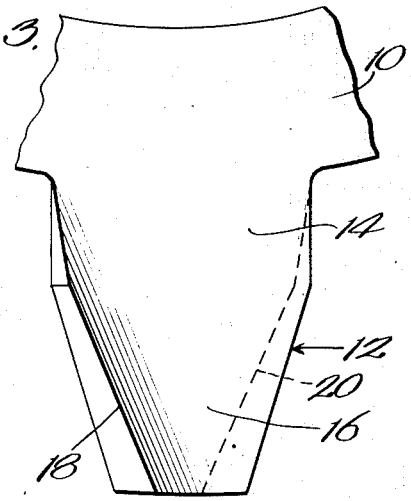
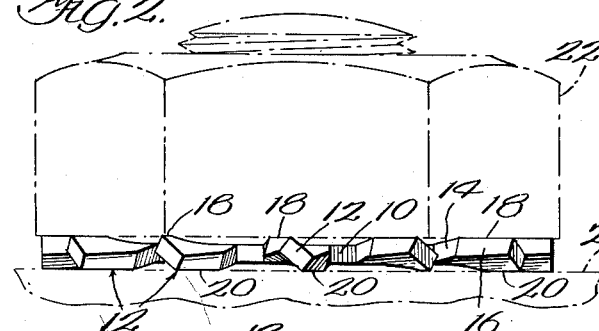
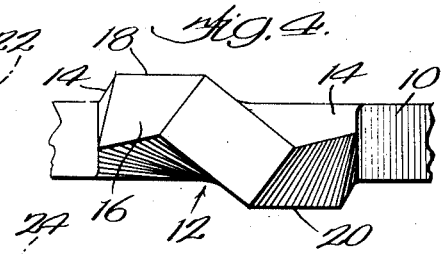
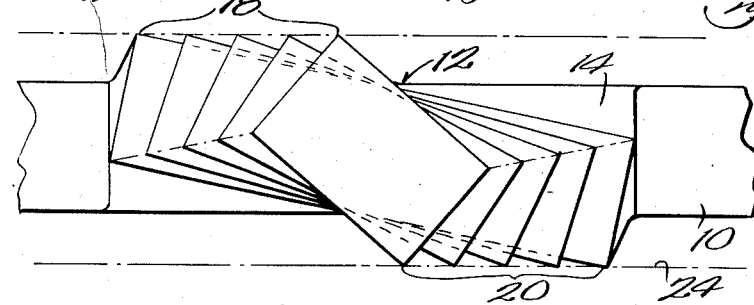
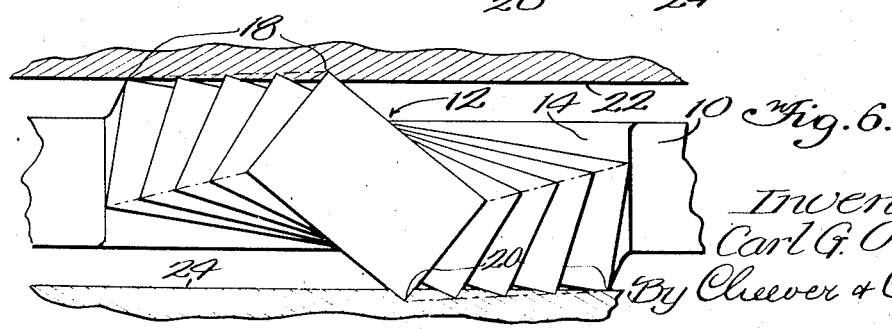
Inventor.
Carl G. Olson
By Cheever & Cox
Attys.

Patented Nov. 18, 1930

1,782,387

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed December 5, 1928. Serial No. 323,838.

My invention relates to lock washers and particularly to lock washers of the twisted tooth type.

I am aware that lock washers provided with a plurality of marginal twisted teeth have heretofore been employed for securing parts against relative rotation. This fact is evidenced by the patent to R. T. Hosking, No. 1,419,564, in which a lock washer or nut lock is disclosed which consists of an annular washer having marginal locking prongs of substantially uniform width twisted out of the plane of the washer so as to position the opposite corners thereof in work engaging relation. In other words, the teeth are so twisted that only the extreme corners thereof are carried into contact with the work.

In general, it is one of the primary objects of my invention to provide a lock washer of the twisted tooth type which represents a decided advancement from the standpoint of efficiency in actual use over the above mentioned and other types of twisted tooth lock washers which have heretofore been and are at present in commercial use.

To attain this object my present invention contemplates the provision of a lock washer in which the marginal teeth are formed or shaped in accordance with a predetermined design which is in accordance with the amount of twist to which the teeth may be safely subjected or, in other words, I propose to co-ordinate the profile of the teeth or prongs with the amount and character of the twist to be imparted thereto.

Another object of my invention is to provide a lock washer of the above mentioned type in which the teeth are so twisted that an increase in locking efficiency will result and to this end I propose to not only carry the outer corners of the prongs into work engaging position, but also a substantial portion of the edges of said prongs, whereby a locking edge rather than a single locking corner will be presented to the work.

Still another and more specific object of my invention is to provide a lock washer in which each marginal tooth is so shaped that the same may be progressively twisted from the root to the end to provide a profile configuration which will lend increased locking efficiency.

In addition to the above mentioned advantageous characteristics, my invention contemplates the provision of a twisted tooth lock washer or another lock in which each tooth is tapered so as to provide a narrowed outer end, said tooth being twisted with a progressive twist from the root thereof to the end so as to present a work engaging or locking tooth edge which is in substantial parallelism with the plane of the washer, thereby presenting a greater linear, locking engagement so as to give the tooth a greater carrying capacity together with increased locking action in comparison with types of twisted tooth lock washers which have heretofore been employed.

These and other objects and advantages will be more readily apparent from the following detailed description when considered in connection with the accompanying drawing, wherein—

Figure 1 is a plan view of a progressively twisted tooth lock washer which is representative of one embodiment of my invention;

Figure 2 is a side elevational view of Figure 1 disclosed in operative association with the work which is indicated by dot and dash lines;

Figure 3 is a fragmentary enlarged plan view of one of the teeth or prongs of the lock washer shown in Figure 1;

Figure 4 is a front elevational view of the tooth shown in Figure 3;

Figure 5 is a diagrammatic representation to illustrate the manner in which the washer teeth or prongs are progressively twisted out of the plane of the washer; and Figure 6 is a diagrammatic view similar to Figure 5 disclosing the manner in which the progressively twisted teeth lockingly engage the work.

Referring now to the drawing more in detail wherein like numerals have been employed to designate similar parts throughout the various figures, it will be observed from Figures 1 to 4 inclusive that a lock washer representing one embodiment of my invention includes an annularly formed body portion 10 and a plurality of marginal prongs or teeth 12. This washer may be stamped or otherwise formed from a sheet or strip of suitable flat stock. It will be noted that each of the teeth 12 are tapered from a neck or root portion 14 thereof. In the disclosed embodiment this neck or root portion extends outwardly a distance which is equivalent to substantially one-third the entire tooth length. It is to be understood, however, that the provision of this neck 14 as well as the specific dimensions thereof will be largely dependent upon the material from which the washer is made.

In accordance with my present invention, these teeth 12 which include the root or neck portion 14 and the portion extending outwardly therefrom, which I have designated by the numeral 16, are twisted out of the plane of the washer body in a predetermined manner. That is to say, each tooth is subjected to a twist which progresses outwardly from the root to the end so as to carry upper and lower work engaging or locking edges 18 and 20 respectively out of the plane of the washer. By progressively twisting I mean imparting a twist to the neck or root 14 of the tooth which is within the elastic limits of the material and then progressively increasing the twist until the outer end of the tooth is reached so as to finally position the work engaging edges 18 and 20 in a plane which is spaced from and substantially parallel with the plane of the washer. A clear understanding of the manner in which I progressively twist the tapered teeth will be obtained from Figure 5 in which a dot and dash line 22 represents the surface of the work which is carried into engagement with the tooth edge 18 and the dot and dash line 24 indicates the work which engages the edge 20. In solid rectangular outline I have shown how the various cross sections of each tooth would appear after said teeth have been subjected to the progressive twist just described. In Figure 5 the work surfaces 22 and 24 are shown in engagement with the tooth locking edges 18 and 20 before said teeth have been clamped between said surfaces. In Figure 6, however, I have disclosed the relative position of the upper tooth and the work surfaces after said tooth has been clamped between said surfaces. It will be observed that these edges become imbedded within the work surfaces so as to securely lock said surfaces against relative movement. It will further be observed that the outer portions of these edges 18 and 20 are more deeply imbedded within the work than the inner portions thereof and the reason for this fact will be apparent from the following analysis.

As already stated, the root or neck 14 of the tooth is first subjected to a twist which is within the elastic limit of the material and this twist is then continued or progressed outwardly to the end of the tooth. Obviously in order to carry the edges 18 and 20 into parallel relation it is necessary to impart a progressively increasing twist from the root outwardly because the outer end of the tooth is narrower than the base or root thereof. Bearing in mind then that the outermost portion of the tooth, as designated by the smallest rectangle in Figures 5 and 6, is subjected to a greater twist than the largest rectangle at the root of the tooth, it will be apparent that when the parallel edges 18 and 20 are clamped between the work surfaces 22 and 24, the outer portion of the tooth will have a much less tendency to untwist than the rear portion. In other words, the diagonal of the entire tooth operates as a strut, with the portion of said diagonal at the outer end being nearer the vertical than the other portions thereof. Hence when the tooth is clamped between the work, the edges 18 and 20 will become imbedded within the work, the forward portions thereof becoming more deeply imbedded than the rear portions. In this manner the entire work engaging edge serves as a means for locking the work in position with increasing locking effectiveness progressing from the root to the outer end of the tooth. Thus instead of locking parts in position by means of the extreme corner of a twisted tooth as has heretofore been practiced in certain instances, my invention enables the use of the entire tooth edge and this tooth edge imbeds itself or digs into the work in a manner which positively secures the work against loosening or unscrewing.

From the foregoing it will be apparent that my invention contemplates the provision of a lock washer in which the locking efficiency is greatly increased. By employing the described geometrical design of tooth, that is to say, by co-ordinating the profile of the washer teeth in accordance with the elastic limits of the material and the nature of twist to which the teeth must be subjected, I am able to employ a locking edge rather than a locking corner to secure the work against rotation. Thus when a lock washer of my improved design is clamped between the facing of the work, the work engaging edges imbed themselves as shown and when the nut is turned in a reverse direction, the tendency to roll or twist the teeth of the washer will serve to cause both work engaging edges to be forced in opposite directions against the work, thereby positively locking said parts against relative movement. Lock washers of my improved design may be made from any suitable flat stock and in this connection reference is made to the application of Richard T. Hosking, Serial No. 240,394, filed December 16, 1927, relating to material strip for use in the manufacture of lock washers. The strip arrangement disclosed in the above application may be effectively employed in the manufacture of lock washers embodying features of my present invention. Likewise, various modifications in the positioning of the teeth and specific arrangement thereof may be made without departing from the spirit and scope of my invention. Thus the prongs or teeth of locking devices of the type disclosed in my co-pending application Serial No. 313,712, filed October 20, 1928, might be constructed in accordance with the teachings of my present invention in order to increase the locking efficiency thereof. Reference to the above mentioned applications has been made with the view of more clearly setting forth the broad and practical application of my invention to structures not specifically disclosed in the drawings and to more clearly set forth the numerous advantages which my present invention presents.

It should be clearly understood that my invention is not limited to the specific prong construction shown in the drawing, but contemplates any prong of the type which is wider at the root than at the outer extremity and which has a portion warped so as to present work engaging edges extending on opposite sides of the plane of the washer body. In other words, my invention contemplates any prong construction as above set forth, in which the diagonal extending between the opposite outwardly projecting edges at the outer portion of the prong is disposed at a greater angle to the plane of the washer than the diagonal extending between the outer edges at the root of said prong. This construction increases the strutting action of the outer portion of the prong or tooth, and thereby increases the locking effectiveness thereof. In this connection reference is made to the disclosure in Figures 5 and 6 of the drawing.

The terms "twisted" and "progressively twisted" as used in the specification and claims should be given their broadest interpretation. In other words, by using the word "twisted" in connection with a lock washer prong or tooth, I do not limit myself to the specific helically twisted type shown in the drawing, but employ the word "twisted" in its broadest sense, which includes warping, bending, flexing, or in any way contorting the washer prong or portion thereof so as to present work engaging and locking edges on opposite sides of the washer body. By the term "progressively twisted" I mean any tooth construction, wherein successive diagonals extending between the work engaging edges of the prong vary in angularity with respect to the washer body from the root of said prong to the outer end thereof. One construction whereby this progressive twisting is attained, is that shown in the drawing, but in no sense should the invention be limited to a prong in which the entire body portion thereof is twisted. In other words, my invention is broad enough to include any warped, flexed, or twisted prong construction, in which the angularity of the diagonal with respect to the washer body increases from the root to the outer end of the prong.

Having thus described my invention, what I claim as new and desire to secure by Letters Patent is:

1. A lock washer having a body portion, locking prongs extending therefrom, said prongs being shaped and twisted out of the plane of the washer body with a greater twist at the outer ends than at the roots thereof so as to present work engaging edges lying in a plane substantially parallel with the plane of the washer, said edges being adapted when the washer is clamped between surfaces of the work, to imbed themselves within said surfaces and thereby secure said work against relative movement.

2. A lock washer having a body portion, work engaging prongs formed marginally and extending radially thereof, said prongs being shaped and twisted out of the plane of the washer body with a greater twist at the outer ends at the roots thereof to position an edge of each of said prongs in substantial parallelism with the plane of the washer, whereby when said washer is clamped between the work, said edge will imbed itself within the surface of the work and in response to a tendency to loosen the work, said edge will exert a force tending to force the work surfaces apart and thereby securely lock the same against further movement.

3. A lock washer having an annular body portion, locking prongs extending laterally of said body, said prongs being of substantially rectangular cross section, and being shaped and progressively twisted out of the plane of the washer with a greater twist at the outer ends than at the roots thereof so as to present work engaging edges lying in a plane throughout a substantial portion of their length which is substantially parallel with the plane of the washer, whereby when said washer is clamped between surfaces of the work, said edges will imbed themselves within said surfaces and thereby secure the work against relative movement.

4. A lock washer having a body portion, locking prongs extending therefrom, said prongs being shaped and progressively twisted from a lesser twist at the roots to a greater twist at the outer ends thereof so as to position work engaging edges in parallel planes throughout a greater portion of their length, whereby when said washer is clamped between the surfaces of the work, said edges will imbed themselves within said surfaces and thereby secure the work against relative movement.

5. A lock washer having a body portion, locking prongs extending therefrom, said prongs being tapered and progressively twisted toward the outer ends thereof so as to position work engaging edges of said prongs in parallel planes throughout a greater portion of their length, whereby said edges, when the washer is clamped between surfaces of the work, will imbed themselves within said surfaces and effectively oppose any tendency to relatively move said work surfaces.

6. A lock washer having an annular body portion, locking prongs extending from said body portion, said prongs being of greater width at their roots and tapering toward the outer ends thereof and having a neck portion adjacent the annular body, said neck being twisted to project the opposite edges of the root of the tooth above and below the plane of the washer body, the remainder of the tooth being twisted into a helix having a lead to place the opposite edges in the same parallel planes that the root corners occupy, to thereby place the opposite edges of the teeth in work engaging and locking position.

7. An annular lock washer including a body portion having sides lying in a parallel plane, prongs extending from said body portion, said prongs being tapered and twisted in geometrical relation to said taper so as to position a greater portion of the opposite edges of said prongs in parallel planes further apart than the side planes of the washer body, whereby said edges will serve, when clamped between surfaces of the work, to effectively lock said surfaces against relative movement.

8. A lock washer comprising an annular body portion of thin spring material, a plurality of radially projecting teeth formed integral with said washer, said teeth spaced apart circumferentially, the circumferential width of each tooth near its point being less than the width adjacent the body portion, each of said teeth being progressively twisted out of the plane of the washer body so as to position opposite work engaging edges throughout the greater length thereof in planes substantially parallel with the plane of the washer body so that when said teeth are clamped between the surfaces of work, the diagonal extending throughout substantially the entire length of each tooth serves to operate as a strut between the work surfaces, said strut tending to force said surfaces apart in response to any tendency to loosen the work and thereby lock the same against further movement.

9. A lock washer having a body portion, a locking prong extending therefrom, the outer end of which is narrower than the root thereof, said prong being progressively twisted out of the plane of the washer stock.

10. A lock washer having a body portion, a locking prong extending therefrom, said prong being twisted out of the plane of the washer stock so as to present work engaging edges lying in a plane substantially parallel with the plane of the washer stock, the outer extremity of said prong being subjected to a greater twist than the root portion thereof.

11. A lock washer having a body portion, a locking prong extending therefrom, the outer end of said prong being narrower than the root thereof, said prong being warped so as to present work engaging edges lying in planes spaced from the body portion, said prong being so warped that the inclination with respect to the washer body of successive diagonals extending between the work engaging edges of said prong, progressively increases from the root of said prong to the outer end thereof to increase the strutting effect of the outer portion of the prong.

12. A lock washer having a body portion, a locking prong extending outwardly therefrom, the outer end of said prong being narrower than the root thereof, said prong being warped so as to present work engaging edges lying in planes spaced from the body portion, said prong being so warped that the inclination with respect to the washer body of successive diagonals extending between the work engaging edges of said prong, progressively increases from the root of said prong to the outer end thereof to increase the strutting effect of the outer portion of the prong.

In witness whereof, I have hereunto subscribed my name.

CARL G. OLSON.

CERTIFICATE OF CORRECTION.

Patent No. 1,782,387. November 18, 1930.

CARL G. OLSON.

It is hereby certified that error appears in the printed specification of the above numbered patent requiring correction as follows: Page 3, line 94, claim 2, after "ends" insert the word than; and that the said Letters Patent should be read with this correction therein that the same may conform to the record of the case in the Patent Office.

Signed and sealed this 24th day of April, A. D. 1934.

Bryan M. Battey (Seal) Acting Commissioner of Patents.